(12) United States Patent
Aumann et al.

(10) Patent No.: US 12,311,864 B2
(45) Date of Patent: May 27, 2025

(54) DECORATIVE LAYER FOR AN INTERIOR TRIM PART AND INTERIOR TRIM PART HAVING THE DECORATIVE LAYER

(71) Applicant: Bayerische Motoren Werke Aktiengesellschaft, Munich (DE)

(72) Inventors: Thomas Aumann, Buch am Erlbach (DE); Florian Dechant, Adlkofen (DE); Maike Dieckmann, Landshut (DE); Johann Gasslhuber, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/627,661

(22) Filed: Apr. 5, 2024

(65) Prior Publication Data
US 2024/0336216 A1  Oct. 10, 2024

(30) Foreign Application Priority Data
Apr. 6, 2023 (DE) .................. 10 2023 108 800.9

(51) Int. Cl.
*B60R 21/2165* (2011.01)
(52) U.S. Cl.
CPC ................ *B60R 21/2165* (2013.01)
(58) Field of Classification Search
CPC .................................................. B60R 21/2165
See application file for complete search history.

(56) References Cited

U.S. PATENT DOCUMENTS

| | | | | |
|---|---|---|---|---|
| 6,224,090 | B1 * | 5/2001 | Lutze ................ | B60R 21/2165 280/728.3 |
| 9,663,057 | B2 * | 5/2017 | Aust ................... | B60R 21/2165 |
| 11,267,428 | B2 * | 3/2022 | Totani ................ | B60R 21/2165 |
| 11,420,580 | B2 * | 8/2022 | Moriizumi ............ | B62D 65/14 |
| 2007/0040360 | A1 | 2/2007 | Riha et al. | |
| 2009/0278337 | A1 * | 11/2009 | Springer ............ | B60R 21/2165 280/728.3 |

(Continued)

FOREIGN PATENT DOCUMENTS

| | | | |
|---|---|---|---|
| CN | 114921594 A | * | 8/2022 |
| DE | 10 2012 214 909 B3 | | 1/2014 |
| DE | 102016001647 A1 | * | 9/2016 |

OTHER PUBLICATIONS

TranslationDE102012214909B3 (Year: 2014).*

(Continued)

*Primary Examiner* — Faye M Fleming
(74) *Attorney, Agent, or Firm* — Crowell & Moring LLP

(57) ABSTRACT

A decorative layer for an interior trim part for covering and/or receiving an airbag in a motor vehicle is able to be arranged in a detachable and/or position-adjustable manner on a carrier element of the interior trim part. The decorative layer has a predetermined breaking point region for arrangement on at least one predetermined breaking point line of the carrier element, through which predetermined breaking point region the airbag can be unfolded in a triggered state. The predetermined breaking point region has at least one means for weakening, in particular of a material, of the decorative layer. An interior trim part for covering an airbag in a motor vehicle includes a carrier element and the decorative layer.

13 Claims, 4 Drawing Sheets

(56) References Cited

U.S. PATENT DOCUMENTS

2016/0137154 A1* 5/2016 Sasu ...................... B60R 13/02
156/252

OTHER PUBLICATIONS

German-language Search Report issued in German Application No. 10 2023 108 800.9 dated Mar. 26, 2024 with partial English translation (12 pages).

* cited by examiner

DECORATIVE LAYER FOR AN INTERIOR TRIM PART AND INTERIOR TRIM PART HAVING THE DECORATIVE LAYER

CROSS REFERENCE TO RELATED APPLICATION

This application claims priority under 35 U.S.C. § 119 from German Patent Application No. 10 2023 108 800.9, filed Apr. 6, 2023, the entire disclosure of which is herein expressly incorporated by reference.

BACKGROUND AND SUMMARY

The invention relates to a decorative layer for an interior trim part for covering and/or receiving an airbag in a motor vehicle. The invention also relates to an interior trim part for covering an airbag in a motor vehicle, comprising a carrier element and the decorative layer.

The prior art has hitherto not disclosed any possibility of implementing airbag solutions that are invisible, as seen from a visible side, in interior components comprising knitted, exchangeable surfaces. Due to the lack of adhesive bonding and resultant lack of fixing of cover and carrier, the existing airbag weakening solutions are not applicable.

Currently, airbag functions in the instrument panel are implemented by defined weakenings of carrier and cover in an adhesively bonded state and in a precisely prepositioned manner.

However, in the event of a lack of pre-fixing and fine positioning, and resultant lack of defined force introduction during airbag deployment, the airbag will inflate in a balloon-like manner over the airbag sack and will tear in an undefined manner. Ideal unfolding of the airbag sack is not possible here, since the non-ideally arranged airbag weakening is positioned differently and results in undesired tearing open. Due to the lacking airbag solution, an exchangeably implemented cover concept in the airbag region, such as the instrument panel on the front passenger side, is also not possible.

It is therefore the object of the present invention to provide a decorative layer for an interior trim part for covering and/or receiving an airbag in a motor vehicle, in which triggering or unfolding of the airbag is optimized by the decorative layer and the interior trim part.

This object is achieved by the feature combination according to the independent claims.

The invention proposes a decorative layer for an interior trim part for covering and/or receiving an airbag in a motor vehicle. In this case, the decorative layer can be arranged in a detachable and/or position-adjustable manner on a carrier element of the interior trim part. The decorative layer also has a predetermined breaking point region for arrangement on at least one predetermined breaking point line of the carrier element, through which predetermined breaking point region the airbag can be unfolded in a triggered state. In addition, the predetermined breaking point region has at least one means for weakening, in particular of a material, of the decorative layer.

This has the advantage that the predetermined breaking point region of the decorative layer arranged in a position-adjustable manner is optimally adapted to a corresponding predetermined breaking point line of the carrier element and can be arranged in the region of the predetermined breaking point line in such a way that, when the airbag is triggered, the latter unfolds in a predetermined manner through the carrier element and the decorative layer. This increases the functionality of the overall system, in particular of the component including airbag.

In one exemplary embodiment of the invention, provision is made for the decorative layer to be a textile, in particular a weft-knitted fabric, a woven fabric, a warp-knitted fabric, a felt or a nonwoven, or a leather or a synthetic leather. These materials are standard decorative materials for an interior trim part and therefore a preferred application for the decorative layer according to the invention.

In a preferred embodiment variant of the invention, provision is made for a means for weakening of the decorative layer to be at least one yarn of the textile, said yarn having, at least in the predetermined breaking point region, a smaller diameter and/or a lower yarn strength than further yarns of the textile. A reduced diameter and/or a reduced thickness and/or a reduced wall thickness as means for weakening of the decorative layer is also possible in the case of a leather or synthetic leather. Furthermore, an alternative means for weakening of the decorative layer is a perforation. In addition, in a further alternative embodiment, the means for weakening of the decorative layer is formed in such a way that the decorative layer in the predetermined breaking point region is at least partially, in particular on a side opposite a visible side of the decorative layer, cut and/or lasered and/or milled and/or ground.

In a preferred exemplary embodiment, the decorative layer according to the invention is formed such that the predetermined breaking point region has a combination of at least two or three different means for weakening of the decorative layer. This further improves unfolding of the airbag through the decorative layer.

In an advantageous embodiment variant, provision is made according to the invention for a multiplicity of the at least one means for weakening of the decorative layer to be arranged in the predetermined breaking point region in such a way that an areal weakening of the decorative layer is formed. An areal weakening of the decorative layer is particularly advantageous, since the unfolding of the airbag through the decorative layer is improved and arrangement of the decorative layer with the areal weakening on the predetermined breaking point line of the carrier element is simplified.

In one exemplary embodiment of the invention, provision is made for the at least one means for weakening of the decorative layer to extend linearly through the decorative layer. An embodiment in which in a mounted state the multiplicity of the at least one linear means for weakening of the decorative layer extend parallel to the at least one predetermined breaking point line of the carrier element or in a corrugated, in particular sinusoidal, form or are formed in a predetermined pattern, in particular crossing one another in such a way that a diamond-shaped pattern is formed, is also favorable.

In an alternative embodiment of the present decorative layer, provision is also made for a design element, which at least partially overlaps the predetermined breaking point region, to be arranged on the decorative layer, in particular a visible side of the decorative layer. This ensures that the predetermined breaking point region of the decorative layer cannot be identified as such and at the same time an appealing design of the decorative layer can be implemented.

The invention also proposes an interior trim part for covering and/or receiving an airbag in a motor vehicle, comprising a carrier element and a decorative layer according to the preceding disclosure. Here, the carrier element forms a receiving space for the airbag and has at least one predetermined breaking point line through which the airbag can be unfolded in a triggered state. The decorative layer is also arranged in a detachable and/or position-adjustable manner on the carrier element in such a way that the at least one predetermined breaking point line of the carrier element is arranged, in particular completely, on the predetermined breaking point region.

It is favorable here that the predetermined breaking point region of the decorative layer arranged in a position-adjustable manner is optimally adapted to a corresponding predetermined breaking point line of the carrier element and is arranged in the region of the predetermined breaking point line in such a way that, when the airbag is triggered, the latter unfolds in a predetermined manner through the carrier element and the decorative layer. This increases the functionality of the overall system, in particular of the component including airbag.

The features disclosed above can be combined as desired, insofar as this is technically possible and they are not mutually exclusive.

Other objects, advantages and novel features of the present invention will become apparent from the following detailed description of one or more preferred embodiments when considered in conjunction with the accompanying drawings.

The figures are by way of example and schematic. Identical reference designations in the figures indicate identical functional and/or structural features.

DETAILED DESCRIPTION OF THE DRAWINGS

Figure 1:
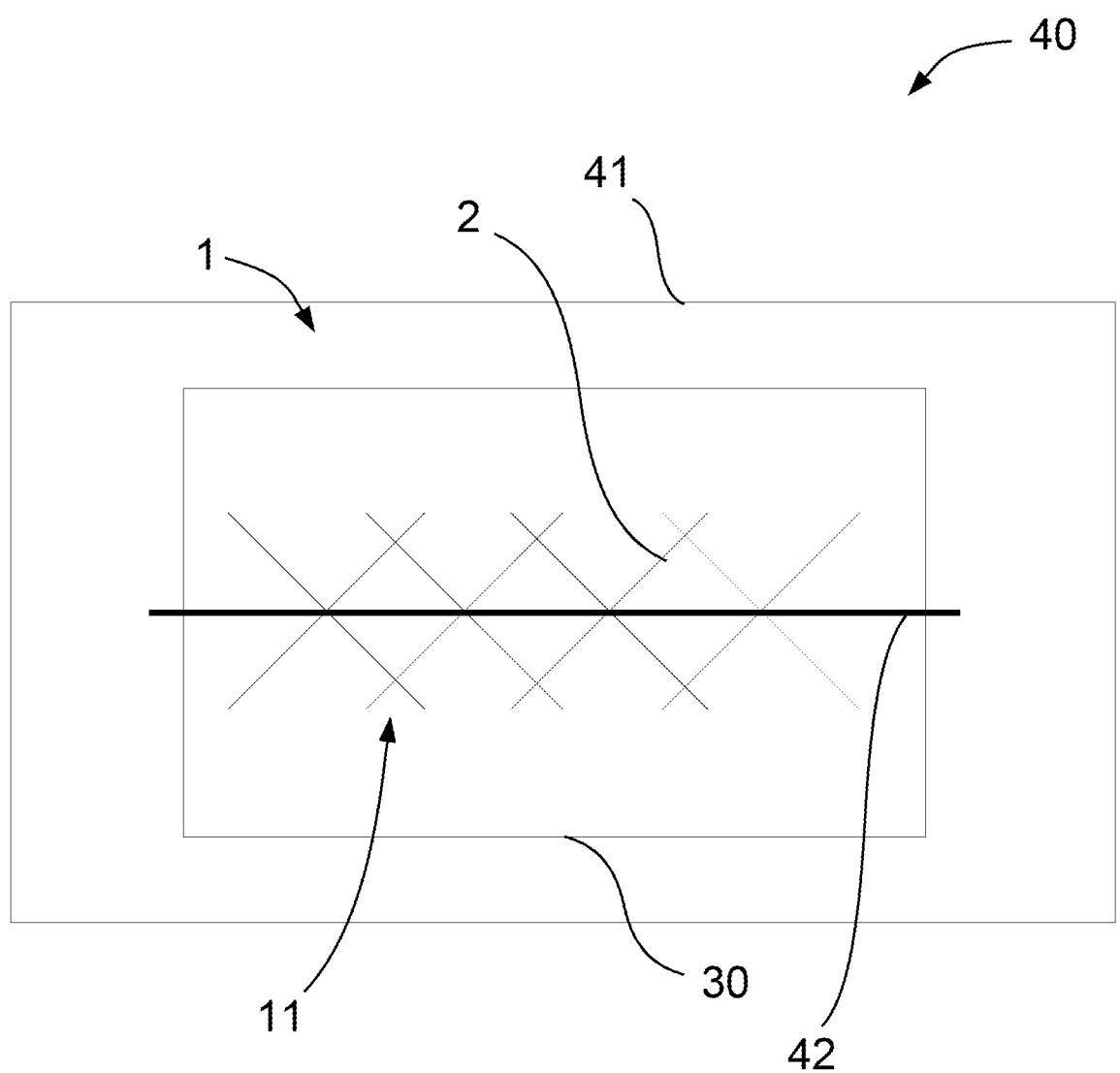
FIG. 1 is a schematic view of an interior trim part having a decorative layer comprising a means for weakening of the decorative layer.

FIG. 1 illustrates a schematic view of an interior trim part 40 having a decorative layer 1 comprising a means 2 for weakening of the decorative layer 1.

The interior trim part 40 for covering and/or receiving an airbag 30 in a motor vehicle comprises a carrier element 41 and the decorative layer 1, which is a weft-knitted fabric. The carrier element 41 forms a receiving space for the airbag 30 and has a predetermined breaking point line 42 through which the airbag 30 can be unfolded in a triggered state. The decorative layer 1 has a predetermined breaking point region 11 for arrangement on the predetermined breaking point line 42 of the carrier element 41, through which predetermined breaking point region the airbag 30 can be unfolded in a triggered state. Furthermore, the decorative layer 1 is arranged in a detachable and/or position-adjustable manner on the carrier element 41 in such a way that the predetermined breaking point region 11 is arranged completely on the at least one predetermined breaking point line 42 of the carrier element 41. Moreover, the predetermined breaking point region 11 has a means 2 for weakening of a material of the decorative layer 1.

In the exemplary embodiment shown in FIG. 1, the means 2 for weakening of the decorative layer 1 is formed in such a way that the decorative layer 1 in the predetermined breaking point region 11 is at least partially, on a side opposite a visible side of the decorative layer 1, cut or incised or incipiently cut and/or lasered and/or milled and/or ground.

A multiplicity of the at least one means 2 for weakening of the decorative layer 1 are also arranged in the predetermined breaking point region 11 in such a way that an areal weakening of the decorative layer 1 is formed. In addition, the at least one means 2 for weakening of the decorative layer 1 extends linearly through the decorative layer 1. The multiplicity of the one linear means 2 for weakening of the decorative layer 1 are formed in a predetermined pattern, specifically crossing one another in such a way that a diamond-shaped pattern is formed.

Figure 2:
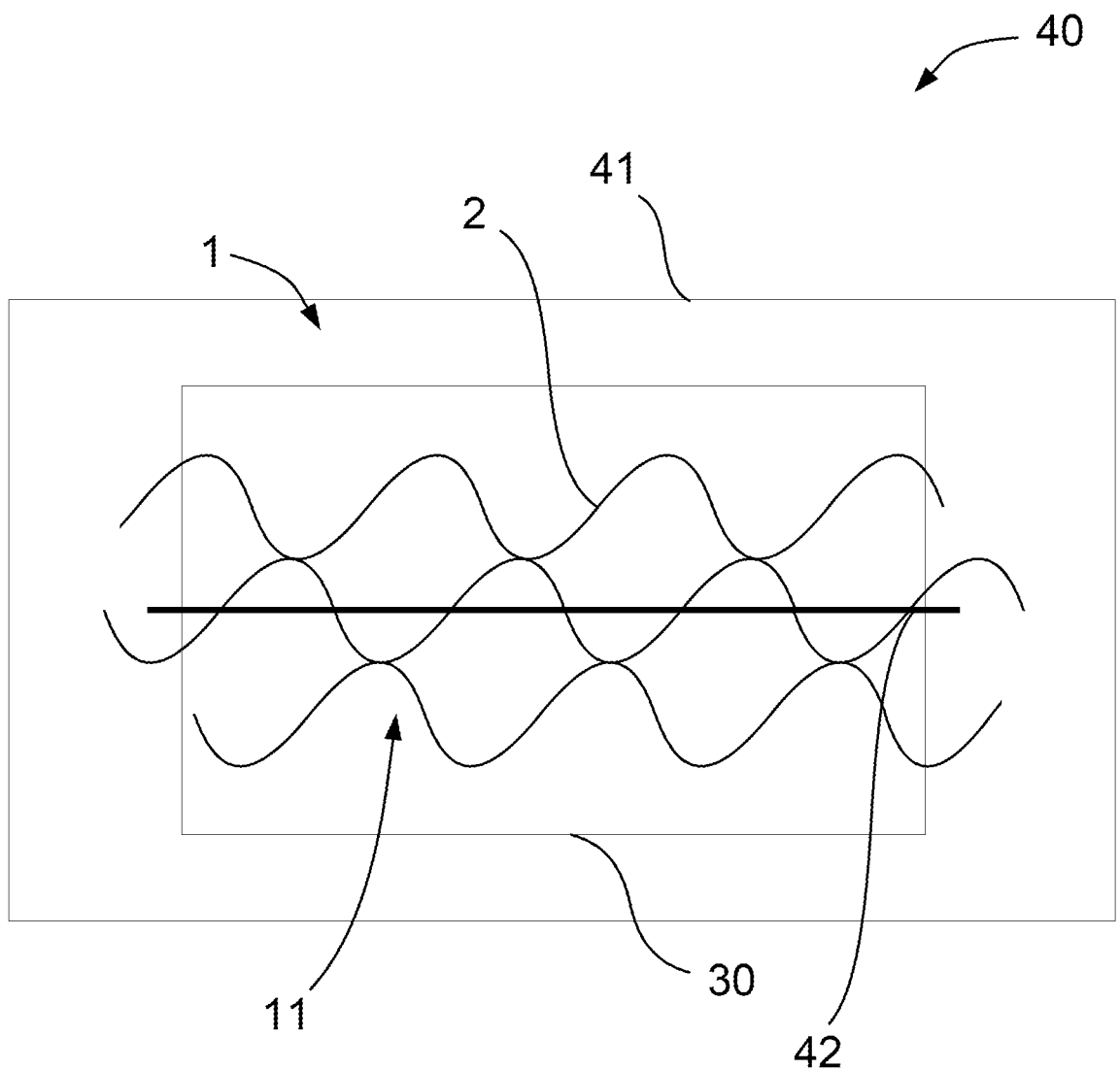
FIG. 2 is a schematic view of an interior trim part having a decorative layer comprising a further means for weakening of the decorative layer.
Figure 3:
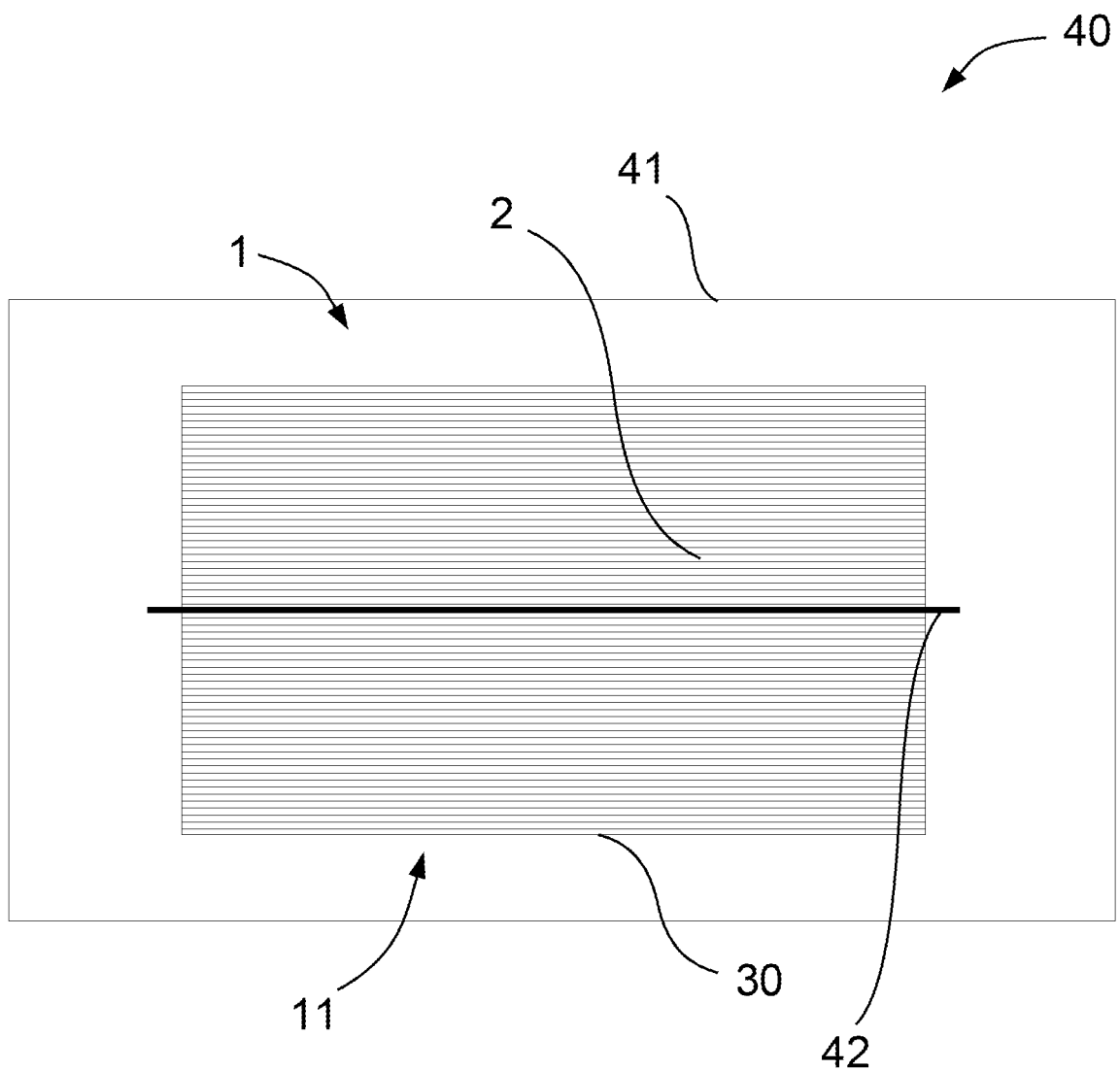
FIG. 3 is a schematic view of an interior trim part having a decorative layer comprising yet a further means for weakening of the decorative layer.
Figure 4:
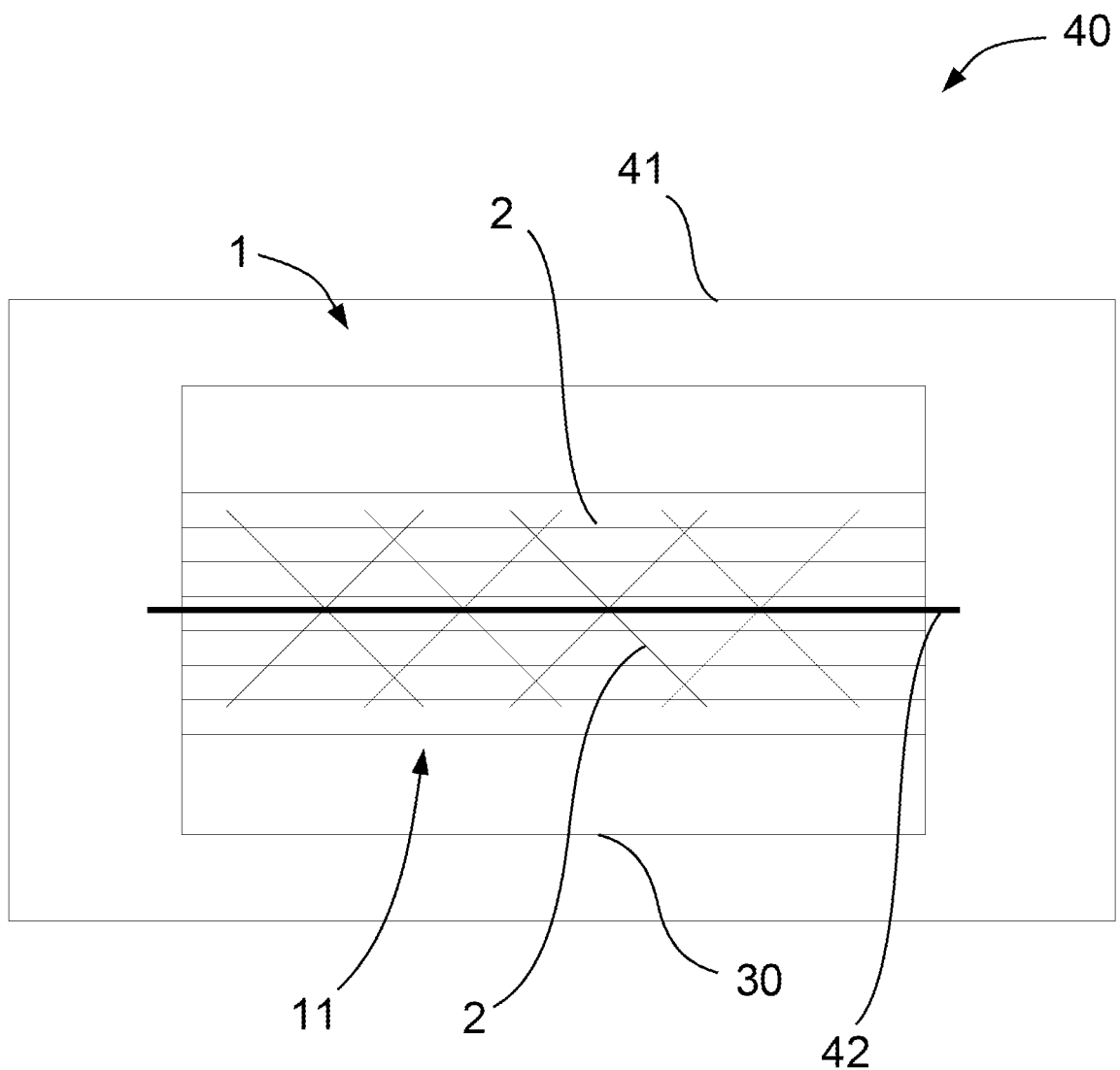
FIG. 4 is a schematic view of an interior trim part having a decorative layer comprising a combination of means for weakening of the decorative layer.

FIGS. 2 to 4 each show an interior trim part 40 which, in terms of the essential features, corresponds to the interior trim part 40 illustrated in FIG. 1. For this reason, only different features are discussed below.

FIG. 2 shows a schematic view of an interior trim part 40 having a decorative layer 1 comprising a further means 2 for weakening of the decorative layer 1, in which the multiplicity of the one linear means 2 for weakening of the decorative layer 1 extend in a sinusoidal form.

FIG. 3 illustrates a schematic view of an interior trim part 40 having a decorative layer 1 comprising yet a further means 2 for weakening of the decorative layer 1. The means 2 for weakening of the decorative layer 1 is a yarn of the weft-knitted fabric, said yarn having, at least in the predetermined breaking point region 11, a smaller diameter and/or a lower yarn strength than further yarns of the weft-knitted fabric. The multiplicity of the at least one linear means 2 for weakening of the decorative layer 1 extend parallel to the at least one predetermined breaking point line 42 of the carrier element 41.

FIG. 4 shows a schematic view of an interior trim part 40 having a decorative layer 1 comprising a combination of means 2 for weakening of the decorative layer 1.

Here, the predetermined breaking point region 11 has a combination of three different means 2 for weakening of the decorative layer 1. First, a means 2 for weakening of the decorative layer 1 is a perforation, which is formed throughout the predetermined breaking point region 11. In addition, a further means 2 for weakening of the decorative layer 1 is a yarn of the weft-knitted fabric, said yarn having, at least in the predetermined breaking point region 11, a smaller diameter and/or a lower yarn strength than further yarns of the weft-knitted fabric. The multiplicity of the further linear means 2 for weakening of the decorative layer 1 extend parallel to the one predetermined breaking point line 42 of the carrier element 41.

Moreover, yet a further means 2 for weakening of the decorative layer 1 is formed in such a way that the decorative layer 1 in the predetermined breaking point region 11 is at least partially, on a side opposite a visible side of the decorative layer 1, cut or incised or incipiently cut and/or lasered and/or milled and/or ground. The multiplicity of the one linear means 2 for weakening of the decorative layer 1 are formed in a predetermined pattern, specifically crossing one another in such a way that a diamond-shaped pattern is formed.

In all the embodiments in FIGS. 1 to 4, a knitting direction of the decoration 1 is horizontal. However, an implementation with a vertical knitting direction is also possible.

The invention is not restricted in terms of its embodiment to the preferred exemplary embodiments specified above. Rather, a number of variants which also make use of the illustrated solution in fundamentally different embodiments are contemplated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A layer for an interior trim part for covering and/or receiving an airbag in a motor vehicle, comprising:
   a decorative layer arrangeable in a detachable/position-adjustable manner on a carrier element of the interior trim part, wherein the decorative layer comprises:
      a predetermined breaking point region configured for arrangement on at least one predetermined breaking point line of the carrier element, through which predetermined breaking point region of the decorative layer the airbag is unfoldable in a triggered state; and
      a plurality of means for weakening a material of the decorative layer in the predetermined breaking point region, wherein none of the plurality of means for weakening the material of the decorative layer contact each other.

2. The layer according to claim 1, wherein
the decorative layer is a textile or is produced from a leather or a synthetic leather.

3. The layer according to claim 2, wherein
each of the plurality of means for weakening the material of the decorative layer comprises at least one yarn of the textile, said yarn having, at least in the predetermined breaking point region, a smaller diameter and/or a lower yarn strength than further yarns of the textile.

4. The layer according to claim 1, wherein
each of the plurality of means for weakening the material of the decorative layer is a perforation.

5. The layer according to claim 1, wherein
each of the plurality of means for weakening the material of the decorative layer is formed such that the decorative layer, in the predetermined breaking point region, is at least partially cut and/or lasered and/or milled and/or ground.

6. The layer according to claim 5, wherein
each of the plurality of means for weakening the material of the decorative layer is formed such that the decorative layer, in the predetermined breaking point region, is at least partially cut and/or lasered and/or milled and/or ground on a side opposite a visible side of the decorative layer when installed in the motor vehicle.

7. The layer according to claim 1, wherein
each of the plurality of means for weakening the material of the decorative layer extends linearly through the decorative layer.

8. The layer according to claim 1, wherein
in a mounted state, each of the plurality of means for weakening the decorative layer extends parallel to the at least one predetermined breaking point line of the carrier element.

9. The layer according to claim 1, further comprising a design element, which at least partially overlaps the predetermined breaking point region, arranged on the decorative layer.

10. An interior trim part for covering an airbag in a motor vehicle, comprising:
    a carrier element forming a receiving space for the airbag and having at least one predetermined breaking point line through which the airbag is unfoldable in a triggered state; and
    a decorative layer arranged in a detachable/position-adjustable manner on the carrier element of the interior trim part, wherein the decorative layer comprises:
       a predetermined breaking point region configured for arrangement on the at least one predetermined breaking point line of the carrier element; and
       a plurality of means for weakening a material of the decorative layer in the predetermined breaking point region, wherein none of the plurality of means for weakening the material of the decorative layer contact each other.

11. A layer for an interior trim part for covering and/or receiving an airbag in a motor vehicle, comprising:
    a decorative layer arrangeable in a detachable/position-adjustable manner on a carrier element of the interior trim part, wherein the decorative layer comprises:
       a predetermined breaking point region configured for arrangement on at least one predetermined breaking point line of the carrier element, through which predetermined breaking point region of the decorative layer the airbag is unfoldable in a triggered state; and
       means for weakening a material of the decorative layer in the predetermined breaking point region,
    wherein the decorative layer is a textile, and
    wherein the means for weakening the material of the decorative layer comprises at least one yarn of the textile, said yarn having, at least in the predetermined breaking point region, a smaller diameter and/or a lower yarn strength than further yarns of the textile.

12. The layer according to claim 11, wherein
the predetermined breaking point region has a combination of at least two or three different means for weakening the material of the decorative layer.

13. The layer according to claim 12, wherein
a multiplicity of the means for weakening the material of the decorative layer are arranged in the predetermined breaking point region such that an areal weakening of the decorative layer is formed.

* * * * *